United States Patent [19]
Yoo

[11] Patent Number: 5,812,201
[45] Date of Patent: Sep. 22, 1998

[54] DATA SYNCHRONIZING APPARATUS AND METHOD THEREOF

[75] Inventor: Ki Ryung Yoo, Seoul, Rep. of Korea

[73] Assignee: LG Semicon Co., Ltd., Cheongju, Rep. of Korea

[21] Appl. No.: 579,129

[22] Filed: Dec. 27, 1995

[30]     Foreign Application Priority Data

Apr. 11, 1995 [KR] Rep. of Korea .................... 1995/8365

[51] Int. Cl.⁶ ........................................................ H04N 7/12
[52] U.S. Cl. ........................ 348/423; 348/845.3; 348/515; 370/509; 375/365
[58] Field of Search ..................................... 348/512, 515, 348/426, 423, 845.3; 395/551, 153; 364/514 R, 514 C, 715.2; 375/362, 364, 365, 366, 368; 370/509, 510, 512, 513

[56]              References Cited

U.S. PATENT DOCUMENTS

| | | | |
|---|---|---|---|
| 5,506,932 | 4/1996 | Holmes et al. ........................ | 395/2.14 |
| 5,588,029 | 12/1996 | Maturi et al. ........................... | 375/364 |
| 5,594,660 | 1/1997 | Sung et al. ......................... | 364/514 R |

*Primary Examiner*—Michael Lee
*Attorney, Agent, or Firm*—Fleshner & Kim

[57]              ABSTRACT

A data synchronizing apparatus and method thereof capable of readily synchronizing video data and audio data by using a read pointer and a write pointer in each memory device storing the video and the audio data, includes a host processor for extracting video data, an information value indicating a start time of video data display and a system clock signal, and storing the extracted video data at a first data storing unit; and a video encoder for controlling a decoding speed of the video data read from a second data storing unit in accordance with a read pointer value of the second data storing unit when reading and decoding a write pointer value of the second data storing unit indicating an area where the extracted video data is to be stored and a video data previously stored at the second data storing unit.

6 Claims, 5 Drawing Sheets

DATA SYNCHRONIZING APPARATUS AND METHOD THEREOF

BACKGROUND OF THE INVENTION

1. Field of the Invention

The present invention relates to a data synchronizing apparatus and a method thereof, and more particularly to a data synchronizing apparatus in which video data and audio data are readily synchronized by using a read pointer and a write pointer in each memory device storing the video and the audio data, and a method thereof.

2. Description of the Prior Art

With reference to FIG. 1, a conventional data synchronizing apparatus includes a host processor 20 for extracting video data, an information PTS value indicating a start time of video data display and a system clock signal SCR value from an inputted bit stream BS after being encoded through an encoder (not shown), obtaining a byte counting value BC1 of the extracted video data VD, and storing the extracted video data VD at a first data storing unit 10; and a video decoder 40 for storing the video data VD at a second data storing unit 30 after reading it from the first data storing unit 10, obtaining a byte counting value BC2 after reading and decoding the stored video data, controlling a decoding speed of the video data read from the second data storing unit 30 in accordance with the byte counting value BC2, the information PTS value indicating the start time of video data display extracted from the host processor 20, the system clock signal SCR value and the byte counting BC1 value, and outputting a video data DVD decoded in accordance with the controlled decoding speed.

The host processor 20 includes a counter 2 for counting the video data extracted from the bit stream BS to obtain the byte counting value BC1.

The video decoder 40 includes an FIFO (First In First Out) unit 4 for first-inputting and first-outputting the information PTS value indicating the start time of video data display and the byte counting value BC1 obtained from the counter 2 in the host processor 20; and a counter 14 for counting the video data read from the second data storing unit 30 to obtain the byte counting value BC2.

With reference to FIG. 4, a conventional data synchronizing method includes: a first step for extracting an information PTS value indicating a start time of video data display, a system clock signal SCR value and video data from an inputted bit stream, obtaining a byte counting value BC1 of the extracted video data, and storing the extracted video data at a first data storing unit 10; a second step for storing the PTS value and the BC1 extracted at the first step at a first-in first-out unit 40 and the SCR value at a memory device (not shown) of the video decoder 40, and reading the video data stored at the first step to store it at a second data storing unit 30; a third step for reading the video data stored at the second step to decode and obtain a byte counting value BC2, and comparing the byte counting value BC2 with the count value BC1 stored at the second step to identify whether they are the same to each other; a fourth step for repeatedly performing the third step if the byte counting value BC2 is not the same as the byte counting value BC1 upon comparison, or otherwise, comparing the PTS value and the SCR value stored at the second step to identify whether the PTS value is the same as the SCR value if the BC1 is the same as the BC2 upon the comparison; a fifth step for outputting a decoded video data having a corresponding PTS value if the PTS value is the same as the SCR value according to a result of the comparison at the fourth step, or otherwise, comparing the PTS value and the SCR value to identify whether PTS value is less than or more than the SCR value if the PTS value is not the same as the SCR value upon the comparison; and a sixth step for not decoding but skipping the video data to be decoded when the PTS value is less than the SCR value according to a result of the comparison at the fifth step, or otherwise, re-displaying the displayed video data if the PTS value is more than the SCR value.

The operation of the conventional data synchronizing apparatus as constructed above will now be described with reference to FIG. 2 to FIG. 4.

At a stage S1, a bit stream BS encoded through an encoder (not shown) is inputted to a host processor 20.

The bit stream normally includes video data, audio data, an information (Presentation Time Stamps; referred to as PTS hereinafter) value indicating a start time of video data display, an information value indicating a start time of audio data transmission, and a system clock signal (System Clock Reference Signal; referred to as SCR hereinafter).

In this respect, only the PTS and the video data are shown in the bit stream in FIG. 2 for explanations purpose.

At the stage S1, when the bit stream BS shown in FIG. 2 is inputted to the host processor 20, at a second stage S2, the host processor 20 extracts the PTS value, the SCR value and the video data VD from the inputted bit stream BS.

For instance, when a PTS value PTS1, a video data VD1 and a SCR value (not shown) included in the bit stream BS shown in FIG. 2 are inputted to the host processor 20 (the stage S1), the host processor 20 extracts the PTS value PTS1, the video data VD1 and the SCR value from the inputted bit stream as described above (the stage S2).

Thereafter, at a third stage, a counter 2 in the host processor 20 obtains a byte counting value BC1, namely, the k1 byte shown in FIG. 2, by byte-counting the extracted video data VD1.

Also, the host processor 20 renders the extracted data VD1 to be stored at a first data storing unit 10 (the stage S3).

Then, at a fourth stage S4, a video decoder 40 stores the PTS value PTS1 and byte counting value BC1, namely, the k1 byte, extracted by the host processor 20 at a first-in first-out unit 4 as shown in FIG. 1, and stores a system clock signal SCR value extracted by the host processor 20 at an internal memory device (not shown).

Also, at a fifth stage S5, the video decoder 40 reads the video data VD1 stored at the first data storing unit 10 and stores it at a second data storing unit 30.

In this respect, as shown in FIG. 3, the first-in first-out unit 4 is a 32-bit memory device while the PTS value is stored at 33-bit memory device, so that the uppermost one bit of the PTS value and the byte counting value k1 is stored at one word (32 bit) and then the PTS value is stored at the next word (32 bit).

The SCR value stored at the memory device of the video decoder 40 is increased by 1 in every 90 KHz by the video decoder 40.

Thereafter, at a sixth stage S6, the video decoder 40 reads and decodes the video data VD1 stored at the second data storing unit 30, and the counter 14 in the video decoder 40 obtains a byte counting value BC2, namely, k1 byte, by byte-counting the video data VD1 as read.

At a seventh stage S7, a comparator (not shown) in the video decoder 40 compares a byte counting value BC1, that is, the k1 byte, stored at the first-in first-out unit 4 with a byte counting value BC2, that is, the k1 byte.

Upon comparison, if the BC1 is not the same as the BC2, the video decoder 40 repeatedly performs the stages S6 and S7.

However, in the above case, since the BC1 is the same as the BC2, the video data VD1 decoded by the video decoder 40 would have the PTS value PTS1 stored at the first-in first-out unit 4.

At this time, at an eighth stage S8, the comparator in the video decoder 40 compares the PTS value at the time when the two values of the BC1 and the BC2 are the same according to a result of the comparison, with the SCR value stored at the memory device of the video decoder 40.

Upon comparison, if the PTS value is the same as the SCR value, a decoded video data DVD having the corresponding PTS value is outputted and displayed at a display unit (not shown).

On the other hand, upon the comparison, at a tenth and a twelfth stages S10 and S12, if the PTS value is not the same as the SCR value, the comparator compares the PTS value and the SCR value whether the former is more or less than the latter.

Upon comparison (stages S10 and S12), at an eleventh stage S11, when the corresponding PTS value is less than the SCR value, the video data having the PTS value is regarded as not the one to be currently displayed but the one which has been displayed at a past time, so that the video decoder 40 skips the video data with the PTS value rather than decoding it, and repeatedly performs the stages S10 and S11 until when the PTS value is the same as the SCR value.

On the other hand, upon the comparison (stages S10 and S12), at a thirteenth stage S13, when the PTS value is more than the SCR value, a video data having the PTS value is one not to be displayed yet, so that the video decoder 40 stops decoding until when the PTS value is the same as the SCR value and outputs the video data VDO stored at the second data storing unit 30.

Likewise as described above, the video data outputted from the video decoder 40 is displayed on the display unit(not shown).

In this respect, the above stages S12 and S13 are repeatedly performed until when the PTS value is the same as the SCR value.

In the meantime, as to the audio data included in the bit stream, in the same way as the method described above, an information value indicating a start time of audio data transmission is compared with the SCR value by the host processor 20 and an audio decoder(not shown), and a decoding speed of the audio data is controlled according to the result of the comparison, so that video data and audio data in the bit stream are synchronized and outputted to a display unit (not shown) and a speaker, respectively.

Also, after the video data VD1 is displayed as described above, the video data VD2 encoded and inputted to the host processor 20 is so displayed at a display unit as also described above, of which description is omitted here.

However, in such a conventional data synchronizing apparatus and a method thereof, a counter for byte-counting the video data is additionally required for the host processor and the video decoder, resulting in that a load is applied when byte-counting, and a size of the device is increased. Also, the video decoder should compare the video data with the byte counting value stored at the first-in first-out unit whenever it reads the stored video data from the second data storing unit, causing a problem that number of the comparison is increased.

SUMMARY OF THE INVENTION

Therefore, an object of the present invention; is to provide a data synchronizing apparatus in which a video data and an audio data are readily synchronized by using a read pointer and a write pointer in each memory device storing the video data and the audio data.

In order to obtain the above object, there is provided one means including a host processor for extracting video data, audio data, an information value indicating a start time of video data display, an information value indicating a start time of audio data transmission and a system clock signal value from an inputted bit stream after being encoded, and respectively storing the extracted video data and audio data at a first and a second data storing units; a video decoder for controlling a decoding speed of the video data read from a third data storing unit in accordance with a read pointer value of the third data storing unit when reading and decoding a write pointer value of the third data storing unit indicating an area where the extracted video data is to be stored and a video data previously stored at the third data storing unit; and an audio decoder for controlling a decoding speed of the video data read from a fourth data storing unit in accordance with a read pointer value of the fourth data storing unit when reading and decoding a write pointer value of the fourth data storing unit indicating an area where the extracted audio data is stored and an audio data previously stored at the fourth data storing unit.

Also, there is provided another means including a first step for extracting video data, audio data, an information value indicating a start time of video data display, an information value indicating a start time of audio data transmission and a system clock signal value from an inputted bit stream after being encoded, and respectively storing the extracted video data and the audio data at the first and the second data storing units; a second step for storing the extracted information value indicating the start time of video data display and the information value indicating the start time of audio data transmission, at a first and a third resistors, and simultaneously storing write pointer values of the third and the fourth data storing units indicating areas where the extracted video data and audio data are respectively stored, at a second and a fourth registers; a third step for reading the video data and the audio data respectively stored at the first and the second data storing units at the first step and storing them at the second and the fourth data storing units; a fourth step for respectively reading and decoding the video data and the audio data each stored at the second and the fourth data storing units at the third step, comparing the read pointer value of the third data storing unit and the write pointer value stored at the second register at the third step in reading the video data and the audio data to identify whether they are the same, and also comparing the read pointer value of the fourth data storing unit and the write pointer value stored at the fourth register at the third step to identify whether they are the same; and a fifth step for repeatedly performing the fourth step if the write pointer value is not the same as the read pointer value upon comparison, or otherwise, controlling a decoding speed of the video data and the audio data at the fourth step if the write pointer value is the same as the read pointer value upon the comparison.

DETAILED DESCRIPTION OF THE INVENTION

The operation of the present invention as constructed above will now be described with reference to the accompanying drawings.

Figure 5:
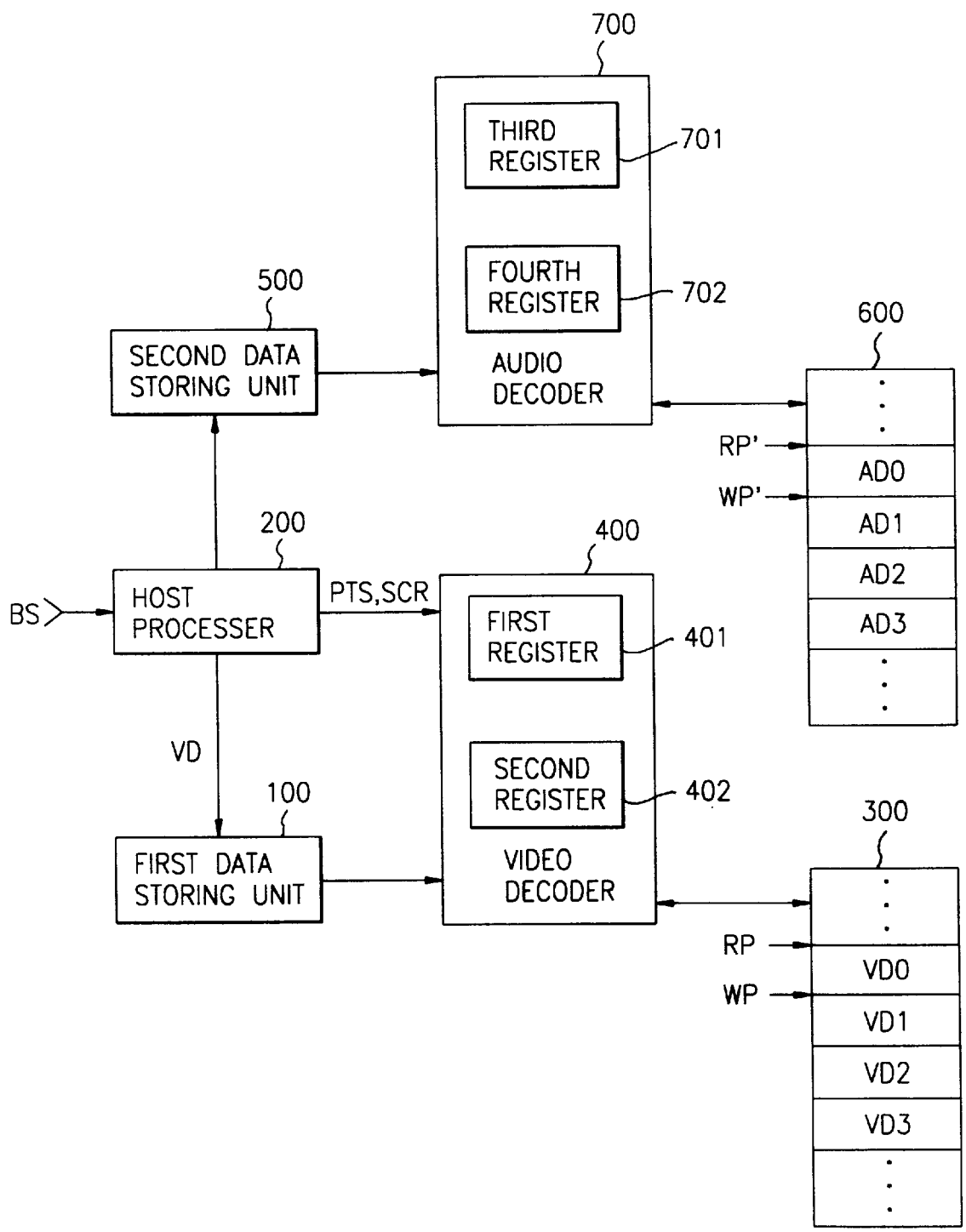
FIG. 5 is a block diagram of a data synchronizing apparatus in accordance with the present invention.

Referring to FIG. 5, a data synchronizing apparatus according to the present invention includes a host processor 200 for extracting video data, an information value PTS indicating a start time of video data display and a system clock signal SCR from an inputted bit stream after being encoded, and storing the extracted video data VD at a first data storing unit 100; and a video decoder 400 for controlling a decoding speed of the video data read from a second data storing unit 300 in accordance with a read pointer RP value of the second data storing unit 300 when reading and decoding a write pointer WP value of the second data storing unit 300 indicating an area where the extracted video data is to be stored and a video data previously stored at the second data storing unit 300, and outputting a decoded video data DVD in accordance with the controlled decoding speed.

The video decoder 400 includes a first register 401 for storing a PTS value read from the host processor 200; and a second register 402 for storing the write pointer WP value of the video data stored at the second data storing unit 300.

Referring to FIG. 5, the host computer 200 further extracts audio data and an information value PTS indicating a start time of audio data playback from the inputted bit stream after being encoded, and stores the extracted audio data AD at a third data storing unit 500. The data synchronizing apparatus further includes an audio decoder 700 for controlling a decoding speed of the audio data read from a fourth data storing unit 600 in accordance with a read pointer RP' value of the fourth data storing unit 600 when reading and decoding a write pointer WP' value of the fourth data storing unit 600 indicating an area where the extracted audio data is to be stored and an audio data previously stored at the fourth data storing unit 600, and outputting a decoded audio data in accordance with the controlled decoding speed.

The audio decoder 700 includes a third register 701 for storing a PTS value read from the host computer 200; and a fourth register 702 for storing the write pointer WP' value of the audio data stored at the fourth data storing unit 600.

Figure 6:
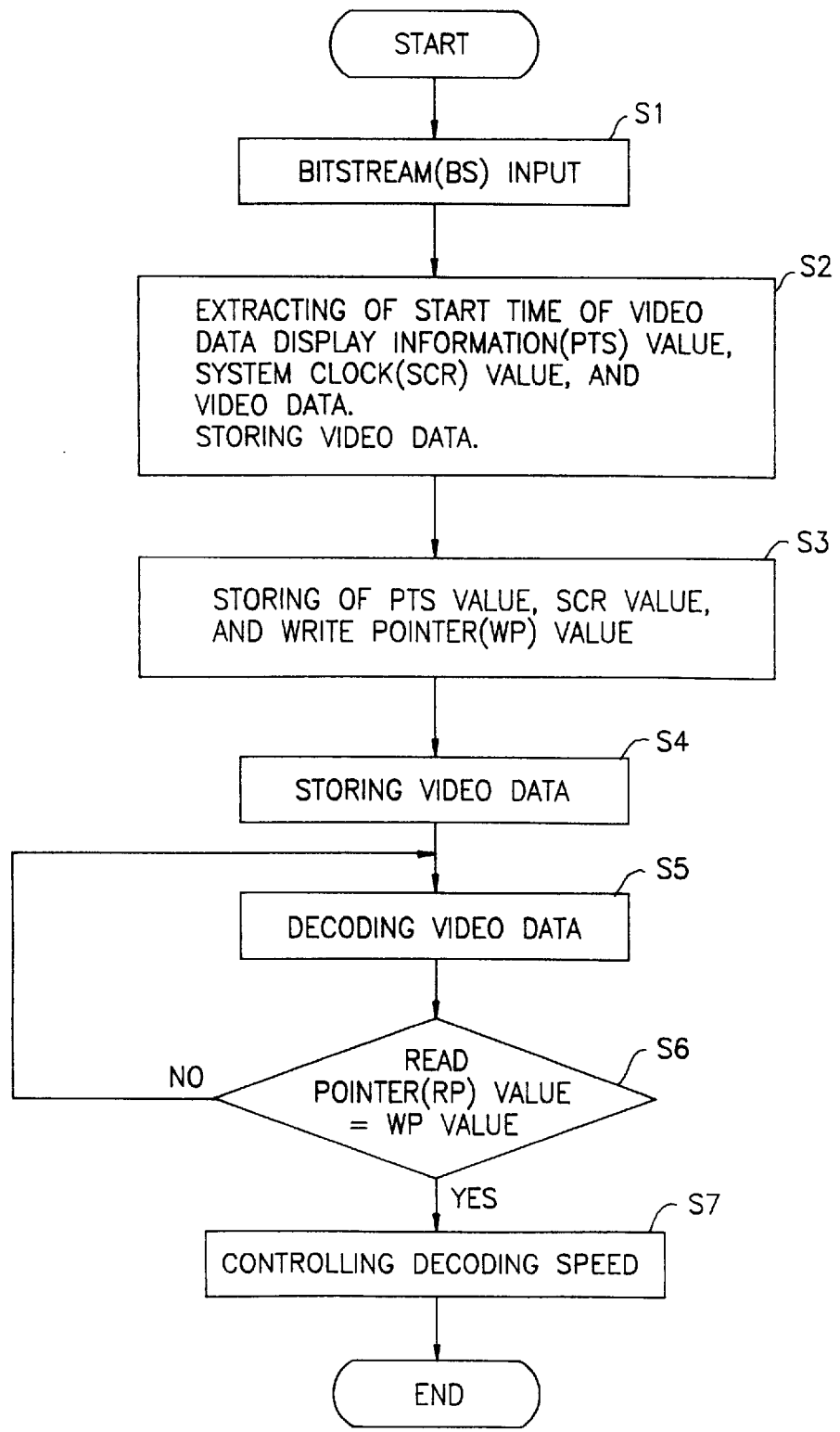
FIG. 6 is a control flow chart of a data synchronizing method in accordance with the present invention.

Also, referring to FIG. 6, a data synchronizing method according to the present invention includes: a first step for extracting video data, an information PTS value indicating a start time of video data display, a system clock signal SCR value from an inputted bit stream BS after being encoded, and storing the extracted video data at a first data storing unit 100; a second step for storing the PTS value at a first register 401, and the SCR value at a memory device (not shown), and also storing a write pointer WP value of a second data storing unit 300 indicating an area where the video data extracted at the first step at a second register 402; a third step for reading the video data stored at the first step and storing it at the second data storing unit 300; a fourth step for reading and decoding the video data stored at the third step, and comparing a read pointer RP value in reading the video data and a write pointer WP value stored at the third step to identify whether they are the same; and a fifth step for repeatedly performing the fourth step if the RP is not the same as the WP upon comparison, or otherwise, controlling a decoding speed of the video data at the fourth step if the RP is the same as the WP upon the comparison.

The operation of the data synchronizing apparatus according to the present invention will now be described in detail with reference to FIG. 2 and FIG. 6.

At a first stage S1, when a bit stream BS having been encoded through an encoder (not shown) is inputted to a host processor 200, and at a second stage S2, the host processor 200 extracts a PTS value, a SCR value and video data from the inputted bit stream BS and stores the extracted video data VD at a first data storing unit 100.

Then, at a third stage S3, a video decoder 400 stores the PTS value extracted from the host processor 200 at a first register 401 while stores the SCR value at an internal memory device (not shown).

At this time, a write pointer WP value of a second data storing unit 300 indicating an area where the video data extracted by the host processor 200 is to be stored is stored at a second register 402 of the video decoder 400.

Thereafter, at a fourth stage S4, the video decoder 400 reads the video data stored at the first data storing unit 100 and stores it at an area of the second data storing unit where the write pointer WP value is indicating.

Figure 1:
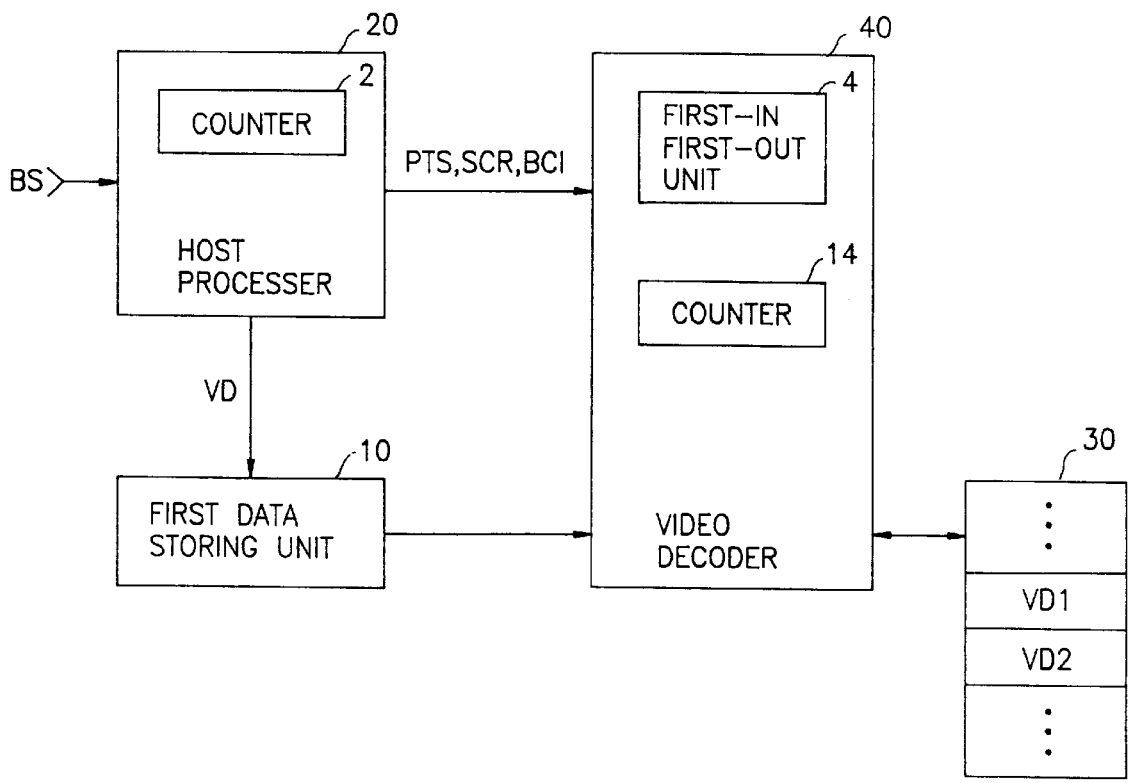
FIG. 1 is a block diagram of a conventional data synchronizing apparatus.
Figure 2:
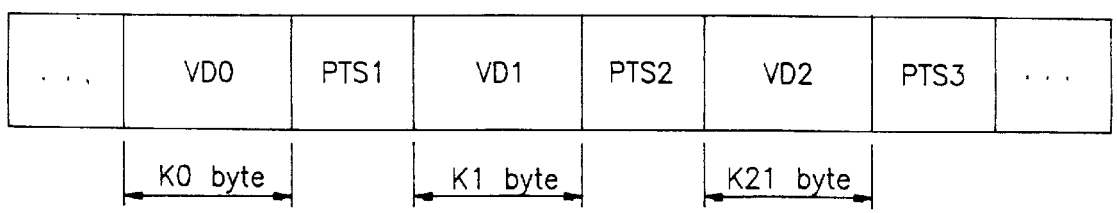
FIG. 2 is a schematic view of a general bit stream.
Figure 3:
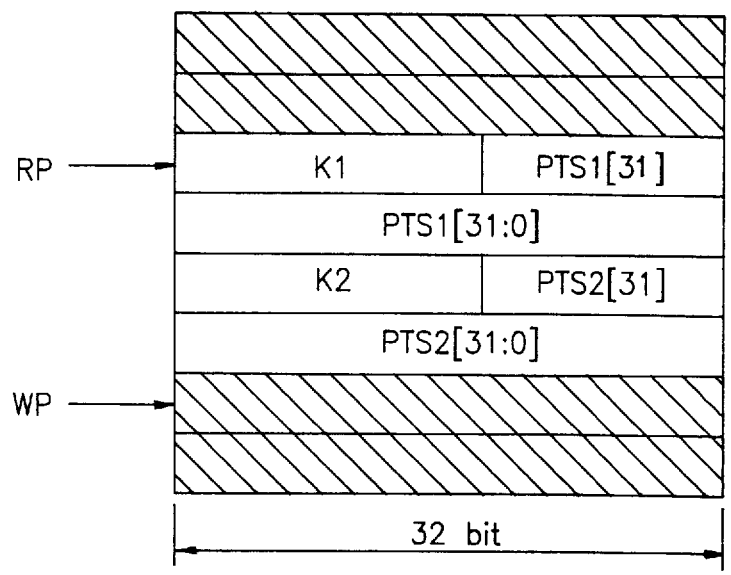
FIG. 3 shows an internal construction of each part of FIG. 1.
Figure 4:
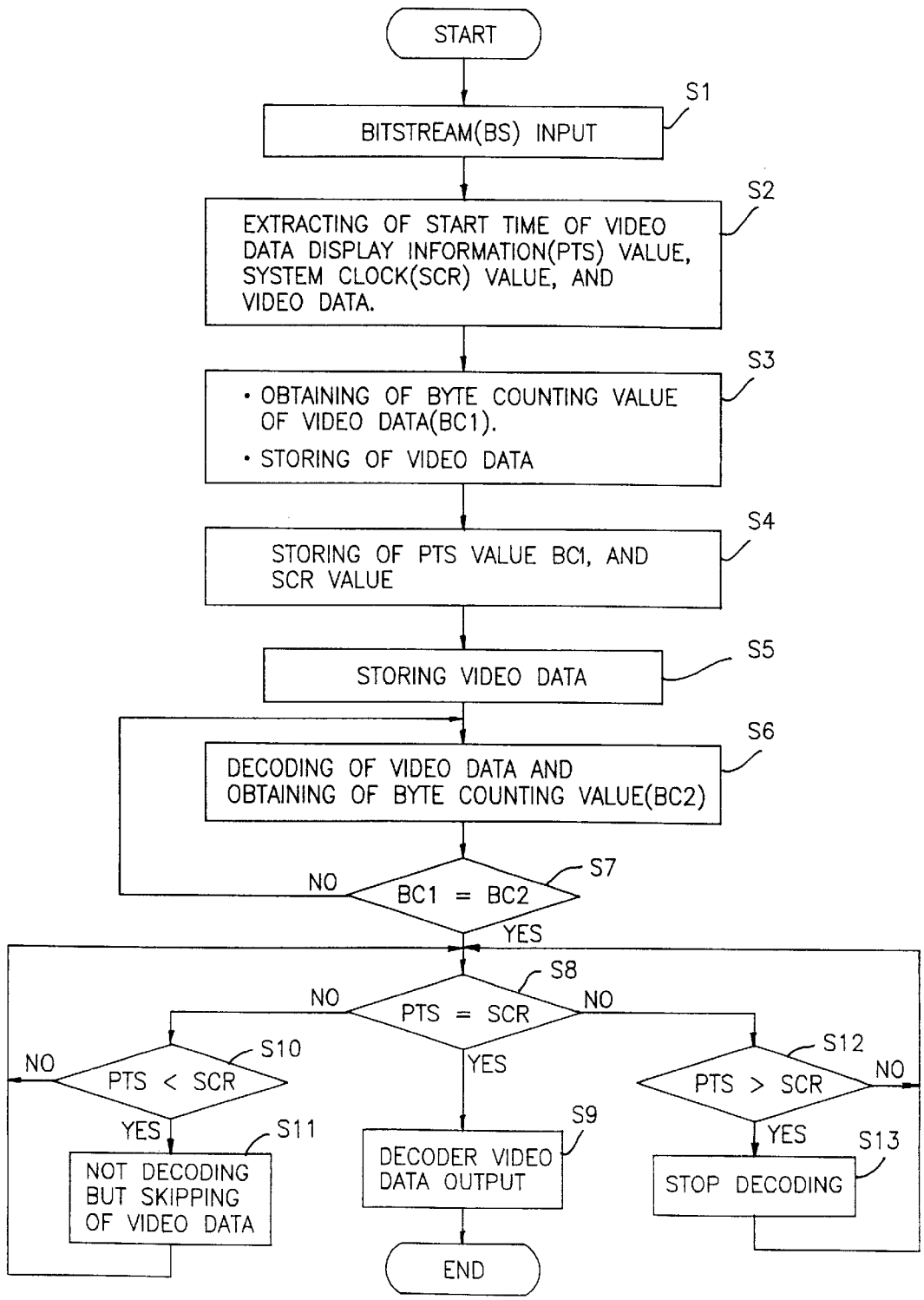
FIG. 4 is a control flow chart according to a conventional data synchronizing method.

For instance, after a video data VDO shown in FIG. 2 is stored at the second data storing unit 300 by the video decoder 400 (the stage S4), when a PTS value PTS1 and a video data VD1 are extracted from an inputted bit stream BS (the stage S2) after being encoded (the stage S1), the video decoder 400 stores the extracted PTS value PTS1 at the first register 401 (the stage S3).

At this time, at the third stage S3, the video decoder 400 stores the write pointer WP value indicating the area of the second data storing unit 300 where the next video data, namely, VD1, is to be stored, at the second register 402.

Thereafter, the extracted (the stage S2) video data VD1 is stored at the first data storing unit 100 and then stored at the area of the second data storing unit 300 where the write pointer WP is indicating, by the video decoder 400 (the stage S4).

Then, at a fifth stage S5, the video decoder 400 reads and decodes the video data VDO stored at the second data storing unit 300.

At this time, at a sixth stage S6, a comparator (not shown) in the video decoder 400 compares the write pointer WP value stored at the second register 402 and the read pointer RP value in reading the video data so as to identify whether they are the same to each other.

Upon comparison (the stage S6), since the write pointer WP value is not the same as the read pointer RP value, the video decoder 400, decodes the video data VD1 stored at the second data storing unit 300 (the stage S5).

The read pointer RP value of the second data storing unit is increased according to the decoding (the stage S5).

Accordingly, at an eighth stage S8, the write pointer WP value and the read pointer RP value are the same to each other. Then, as previously described, the comparator in the video decoder 400 compares the PTS value PTS1 of the video data VD1 when the write pointer WP value is the same as the read pointer RP value, with the stored SCR value stored at the second stage S2 to identify whether they are the same, and controls the decoding speed of the video data VD1 read from the second data storing unit 300 according to a result of the comparison.

In the meantime, as to audio data included in the bit stream, likewise as also previously described, an information value indicating a start time of audio data transmission is compared to a SCR value by the host processor 200 and an audio decoder 700, and a decoding speed thereof is controlled according to a result of the comparison, so that a video data and the audio data included in the bit stream BS are synchronized and outputted to a display unit (not shown) or to a speaker (not shown), respectively.

After the video data VD1 is displayed as described above, the video data VD2 and VD3 inputted to the host processor 200 after being encoded are also displayed on a display unit in the same way as described above, of which description is omitted here.

As so far described, according to the apparatus and the method for synchronizing the data according to the present invention, no counter is required to byte-count the video data at the host processor aid at the video decoder, resulting in that a size of the device is relatively reduced. Moreover, since the video decoder compares the PTS value and the SCR value only when a first video data of the displayed video is decoded, so that number of the comparison can be considerably decreased.

What is claimed is:

1. A data synchronizing apparatus comprising:
    a host processor for extracting video data, audio data, an information value indicating a start time of video data display, an information value indicating a start time of audio data transmission and a system clock signal value from an inputted bit stream after being encoded, and respectively storing the extracted video data and audio data at a first and a second data storing units;
    a video decoder for controlling a decoding speed of the video data read from a third data storing unit in accordance with a read pointer value of the third data storing unit when reading and decoding a write pointer value of the third data storing unit indicating an area where the extracted video data is to be stored and a video data previously stored at the third data storing unit; and
    an audio decoder for controlling a decoding speed of the audio data read from a fourth data storing unit in accordance with a read pointer value of the fourth data storing unit when reading and decoding a write pointer value of the fourth data storing unit indicating an area where the extracted audio data is stored and an audio data previously stored at the fourth data storing unit.

2. The apparatus according to claim 1, wherein the video decoder includes:
    a first register for storing an information value indicating a start time of video data display as extracted; and
    a second register for storing the write pointer value of the third data storing unit indicating the area where the extracted video data is to be stored.

3. The apparatus according to claim 1, wherein the audio decoder includes:
    a third register for storing an information value indicating a transmitting point of time of the extracted audio data; and
    a fourth register for storing the write pointer value of the fourth data storing unit indicating the area where the extracted audio data is to be stored.

4. A data synchronizing method comprising the steps of:
    a first step for extracting video data, audio data, an information value indicating a start time of video data display, an information value indicating a start time of audio data transmission and a system clock signal value from an inputted bit stream after being encoded, and respectively storing the extracted video data and the audio data at a first and a second data storing units;
    a second step for storing the extracted information value indicating the start time of video data display and the information value indicating the start time of audio data transmission, at a first and a third registers, and simultaneously storing write pointer values of a third and a fourth data storing units indicating areas where the extracted video data and audio data are to be respectively stored, at a second and a fourth registers;
    a third step for reading the video data and the audio data respectively stored at the first and the second data storing units at the first step, and storing them at the second and the fourth data storing units;
    a fourth step for respectively reading and decoding the video data and the audio data each stored at the second and the fourth data storing units at the third step, comparing the read pointer value of the third data storing unit and the write pointer value stored at the second register at the third step in reading the video data and the audio data to identify whether they are the same, and also comparing the read pointer value of the fourth data storing unit and the write pointer value stored at the fourth register at the third step to identify whether they are the same; and
    a fifth step for repeatedly performing the fourth step if the write pointer value is not the same as the read pointer value upon comparison, or otherwise, controlling a decoding speed of the video data and the audio data at the fourth step if the write pointer value is the same as the read pointer value upon the comparison.

5. The apparatus according to claim 2, wherein the video decoder repeatedly compares the read pointer value of the third data storing unit and the write pointer value and controls the decoding speed of the video data if the write pointer value is the same as the read pointer value upon the comparison.

6. The apparatus according to claim 3, wherein the audio decoder repeatedly compares the read pointer value of the fourth data storing unit and the write pointer value and controls the decoding speed of the audio data if the write pointer value is the same as the read pointer value upon the comparisons.

* * * * *